United States Patent [19]

Tani et al.

[11] Patent Number: 4,764,824
[45] Date of Patent: Aug. 16, 1988

[54] DUAL SERVO SYSTEM FOR ROTATING TAPE HEAD CONTROL

[75] Inventors: Toshiyuki Tani, Kanagawa; Yoshizumi Inazawa, Tokyo; Toshihiko Takahashi, Chiba; Shigeyuki Satomura, Tokyo, all of Japan

[73] Assignee: Sony Corporation, Tokyo, Japan

[21] Appl. No.: 841,620

[22] Filed: Mar. 20, 1986

[30] Foreign Application Priority Data

Mar. 25, 1985 [JP] Japan .................. 60-060108

[51] Int. Cl.⁴ .................. G11B 5/52; G11B 21/04
[52] U.S. Cl. .................. 360/70; 360/75
[58] Field of Search .......... 360/70, 75, 10.1–10.3, 360/73, 77, 32, 14.2, 14.3

[56] References Cited

U.S. PATENT DOCUMENTS

| | | | |
|---|---|---|---|
| 3,585,291 | 6/1971 | Yamakawa | 360/70 |
| 4,210,943 | 7/1980 | Nakamura et al. | 360/70 |
| 4,486,794 | 4/1984 | Itoh | 360/70 |
| 4,584,618 | 4/1986 | Tassery | 360/70 |

FOREIGN PATENT DOCUMENTS

| | | |
|---|---|---|
| 0066445 | 12/1982 | European Pat. Off. |
| 0075948 | 4/1983 | European Pat. Off. |
| 0098349 | 1/1984 | European Pat. Off. |
| 0123946 | 11/1984 | European Pat. Off. |
| 59-198555 | 11/1984 | Japan .................. 360/73 |
| 2109134 | 5/1983 | United Kingdom |

Primary Examiner—Raymond F. Cardillo
Assistant Examiner—Steven R. Garland
Attorney, Agent, or Firm—Lewis H. Eslinger; Maioli, Jay H.

[57] ABSTRACT

Apparatus including a rotary head accurately reproduces a digital signal recorded on a tape, even when the tape runs at high speed. Transitions of a reproduced signal are detected, intervals corresponding to the transitions are counted on the basis of a predetermined reference signal, and the rotation of the rotary head is controlled in response to the counted value so that the relative speed between the rotary head and the tape is held constant, notwithstanding changes in the absolute speed of the tape, as in the fast-forward mode.

6 Claims, 7 Drawing Sheets

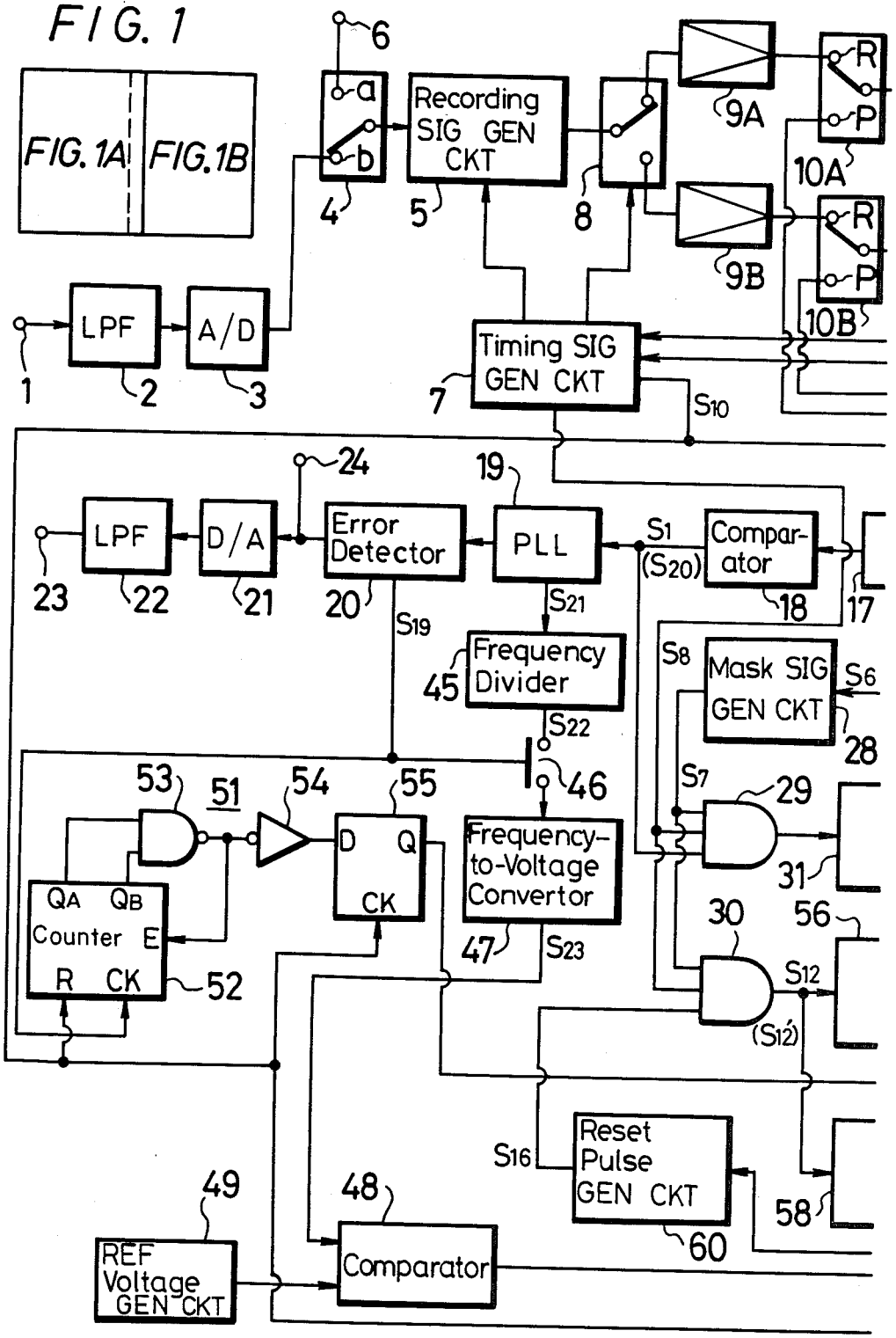

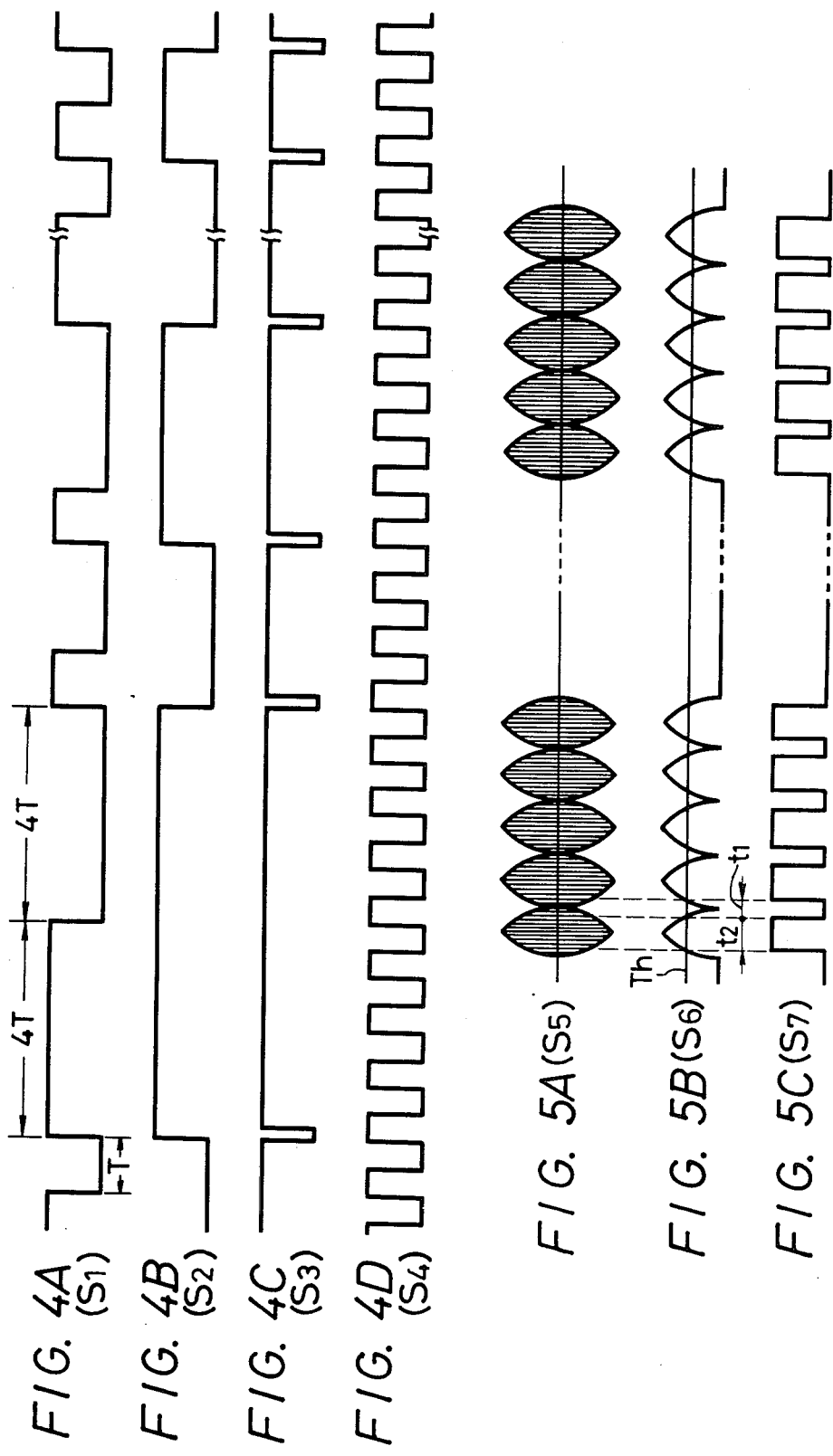

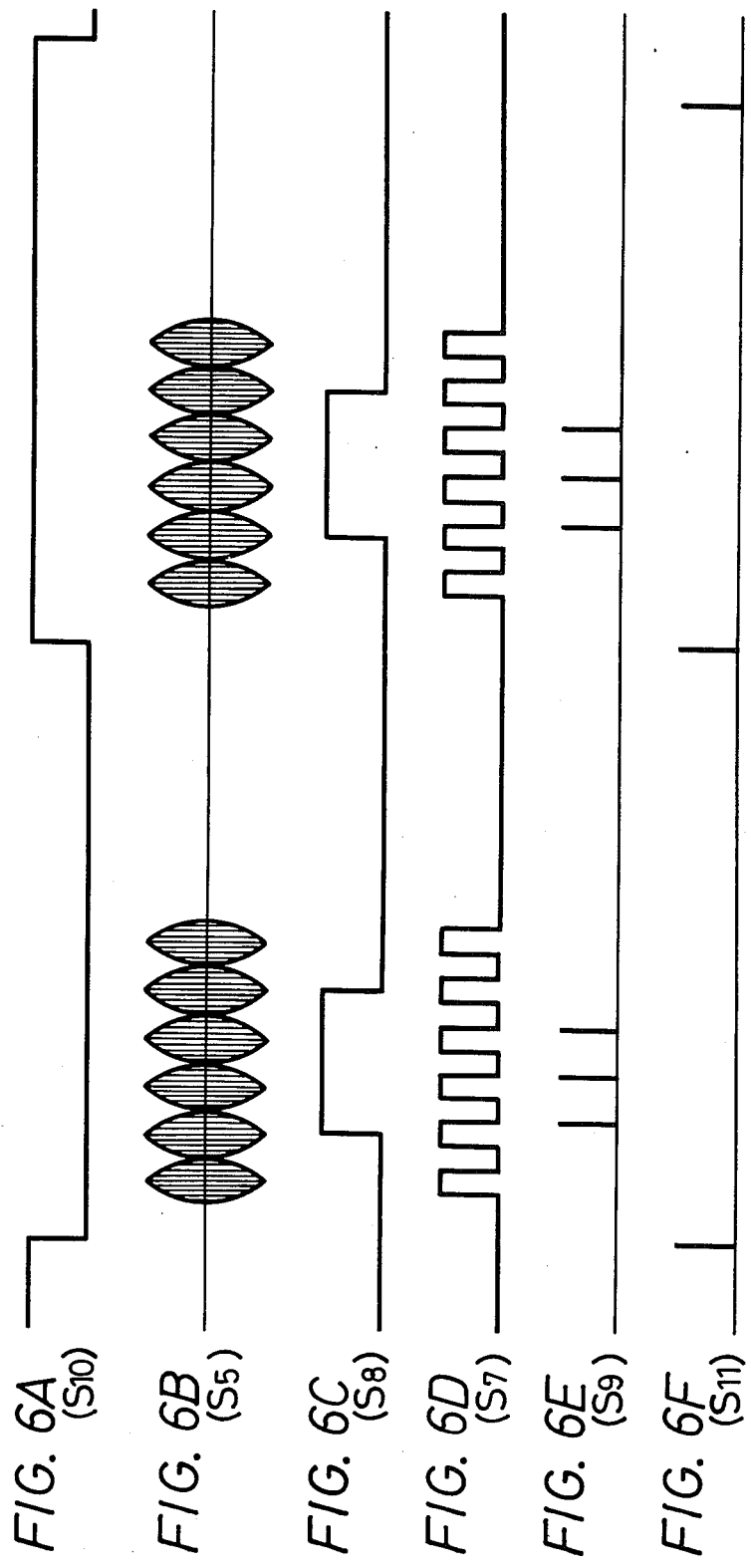
FIG. 6A (S10)
FIG. 6B (S5)
FIG. 6C (S8)
FIG. 6D (S7)
FIG. 6E (S9)
FIG. 6F (S11)

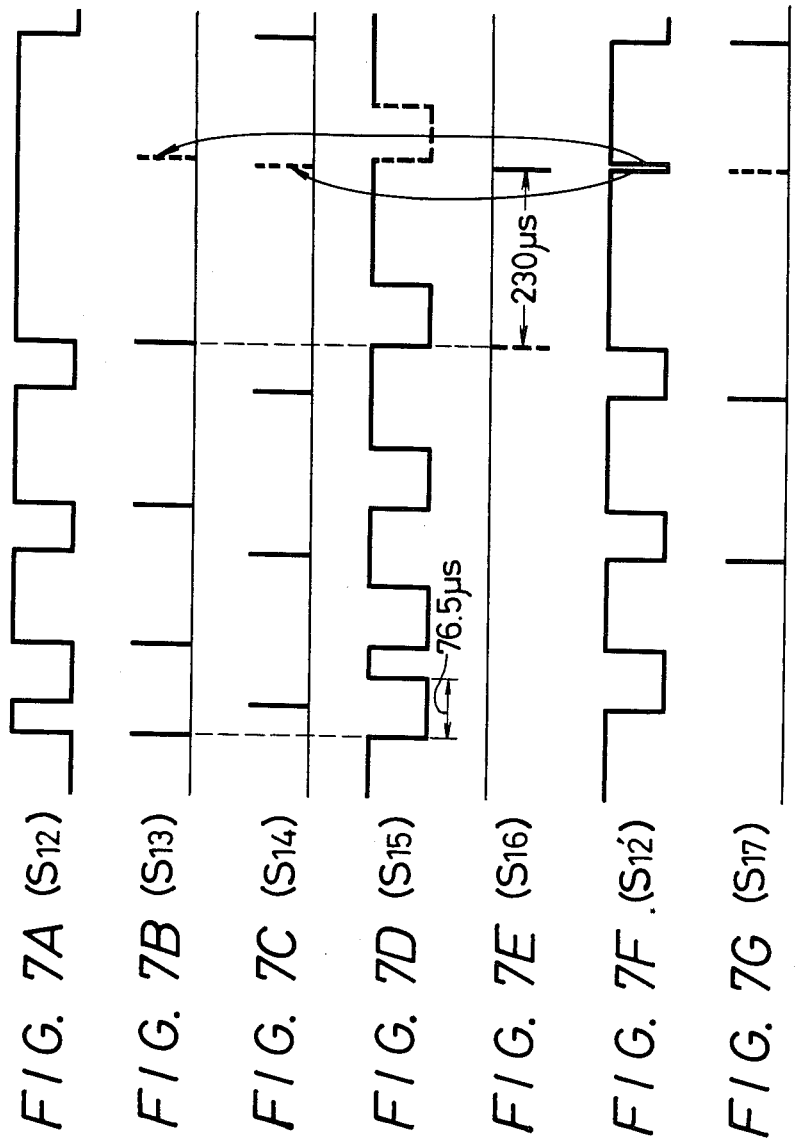

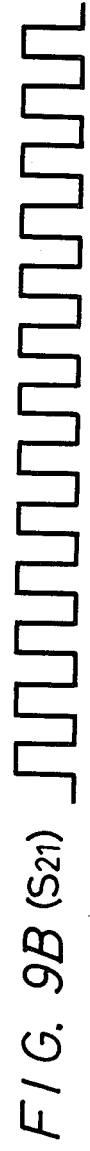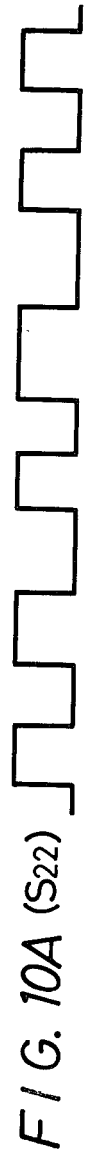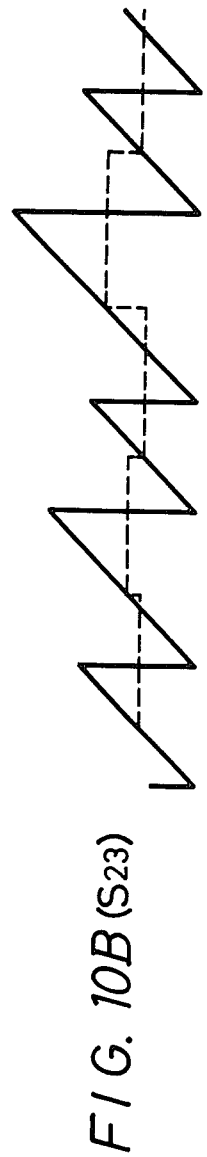
F I G. 8A (S18)  F I G. 8B (S19)  F I G. 9A (S20)  F I G. 9B (S21)  F I G. 10A (S22)  F I G. 10B (S23)

DUAL SERVO SYSTEM FOR ROTATING TAPE HEAD CONTROL

BACKGROUND OF THE INVENTION

1. Field of the Invention

This invention relates to apparatus for reproducing a digital signal and, more particularly, to novel and highly-effective apparatus for reproducing a digital signal recorded on a tape by a rotary head.

2. Description of the Prior Art

Apparatus for recording and reproducing a digital signal is known, in which an analog signal such as an audio signal or the like is converted to a digital signal; a digital signal indicative of an address, a program number and the like together with the converted digital signal is recorded by a rotary head on a tape that is transported at a normal speed; the digital signal thus recorded is reproduced from the tape transported at the normal speed; the reproduced digital signal is converted to an analog signal such as an audio signal; and the recorded address, program number and the like are confirmed. For example, European patent application Ser. No. 0092403, filed by the assignee of the present application and published on Oct. 26, 1983, discloses such apparatus for recording and reproducing a digital signal. In the conventional recording apparatus, it is required that, even when the tape is transported at a high speed, a part of the digital signal such as an address signal and program number recorded on the tape be reproduced by the rotary head to confirm the position of the information recorded on the tape and to control the operation of the tape. However, when the tape is transported at high speed, if the rotary head is rotated at the normal speed, the relative speed between the tape and the head becomes different from that in the normal playback mode. Thus it becomes difficult to reproduce the digital signal recorded on the tape.

Copending U.S. patent application Ser. No. 06/791,518, filed on Oct. 25, 1985, by the assignee of the present application, discloses apparatus for reproducing a digital signal recorded on a tape, the apparatus including means for controlling the relative speed between the tape and a rotary head to become substantially the same as that in the normal playback mode, even when the tape runs at high speed. In the aforesaid apparatus, when the relative speed between the tape and the rotary head deviates significantly, the rotation of the rotary head is controlled in response to the maximum transition interval of the reproduced digital signal. In this case, however, if a drop-out occurs in the reproduced signal because of dust, scratches and the like on the tape, the accuracy of the control of the rotation of the rotary head is diminished.

OBJECTS AND SUMMARY OF THE INVENTION

An object of this invention is to provide improved apparatus for reproducing a digital signal, particularly a digital signal recorded on a tape by a rotary head.

Another object of this invention is to provide improved apparatus for reproducing a digital signal which includes means for controlling the relative speed between a tape and a rotary head to become substantially the same as in the normal playback mode, even when the tape runs at high speed.

According to one aspect of the present invention, there is provided apparatus comprising: rotary head means for reproducing a digital signal recorded on a tape, the digital signal exhibiting multiple transitions; detecting means for detecting the transitions; counting means for accumulating a count proportional to an interval corresponding to the detected transitions; and control means for controlling the rotation of the rotary head means in response to the count so that the relative speed between the rotary head means and the tape becomes constant.

BRIEF DESCRIPTION OF THE DRAWINGS

A better understanding of these and other objects, features and advantages of the present invention will become apparent from the following detailed description of the preferred embodiments thereof taken in conjunction with the accompanying drawings, wherein a given reference character always refers to the same element or part, and wherein:

FIG. 3, FIGS. 4A to 4D, FIGS. 5A to 5C and FIGS. 6A to 6F are respectively waveform diagrams useful for explaining the operation of the reproducing apparatus of FIG. 1; and FIGS. 7A to 7G, FIGS. 8A and 8B, FIGS. 9A and 9B and FIGS. 10A and 10B are respectively additional waveform diagrams useful for explaining the operation of the reproducing apparatus of FIG. 1.

DESCRIPTION OF THE PREFERRED EMBODIMENTS

Figure 1B:
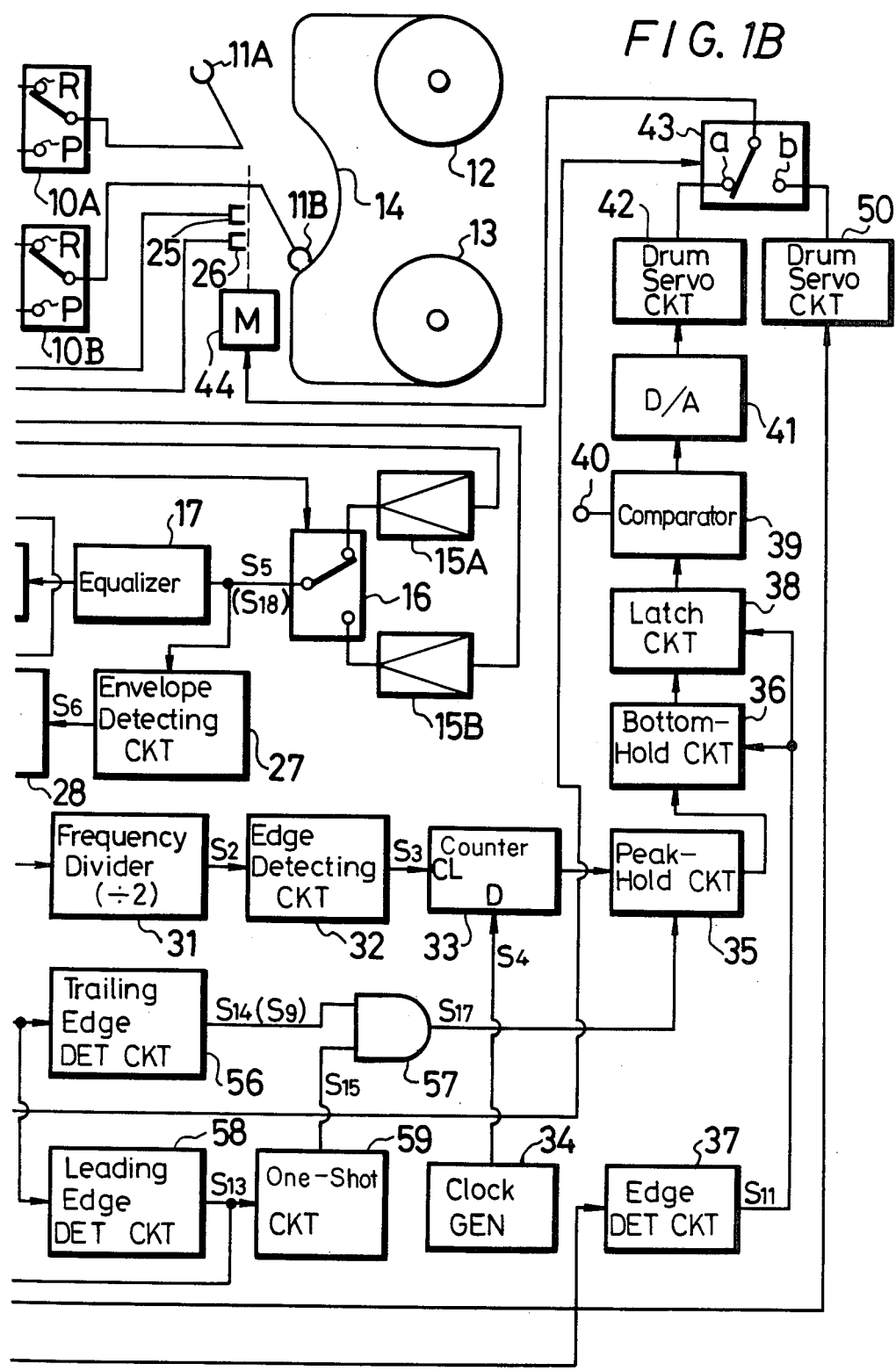
FIG. 1 (formed of FIGS. 1A and 1B with FIG. 1A to the left of and partly overlapping FIG. 1B) is a block diagram showing a preferred embodiment of apparatus for reproducing a digital signal according to the present invention.

FIG. 1 (formed of FIGS. 1A and 1B) is a block diagram of a circuit for a preferred embodiment of apparatus for reproducing a digital signal according to this invention.

An analog signal, for example an audio signal applied to an input terminal 1, is supplied through an LPF (low-pass filter) 2 and an A/D (analog-to-digital) converter 3 in which it is converted from an analog signal to a digital signal. The digital signal from the A/D converter 3 is then supplied through a contact b of a switching circuit 4 to a recording signal generating circuit 5. Alternatively, it is possible to supply a digital signal from a terminal 6 directly to the recording signal generating circuit 5 by changing the position of the switching circuit 4 to its contact a.

In the recording signal generating circuit 5, signal processing such as the addition of an error correction code to the data, processing of the data in such a manner as to interleave it, modulation and so on are carried out in response to a timing signal from a timing signal generating circuit 7. The data signal is then supplied to a switching circuit 8. The reproducing apparatus of the invention employs a modulation system in which the minimum transition interval (Tmin) is T and the maximum transition interval (Tmax) is 4T. The pattern of the modulated signal is formed of four periods or intervals of T, 2T, 3T and 4T, where T is taken as the fundamental period. The recorded signal is organized into blocks, and a synchronizing signal occurs at the beginning of each block.

The synchronizing signal is formed of the succession of two maximum transition intervals Tmax (4T) and Tmax (4T), which do not exist in the data signal and therefore can be easily distinguished from the data signal. The switching circuit 8 is used to switch rotary heads 11A and 11B (FIG. 1B) at the proper times and is alternately changed in position by the switching signal from the timing signal generating circuit 7 during a first half-revolution interval including the tape contact period of the head 11A and during a second half-revolution interval including the tape contact period of the head 11B.

The tape is wrapped around the drum (not shown) supporting the heads 11A and 11B over a tape wrapping angle of 90°. A pulse of 30 Hz indicative of the rotary phase of the rotary heads 11A and 11B and generated by a pulse generator 25 in synchronism with the revolution of a motor for driving the rotary heads 11A and 11B is supplied to the timing signal generating circuit 7. A signal generated by a frequency generator 26 that is mounted on a rotary shaft of the motor 44 is also supplied to the timing signal generating circuit 7, pulse generators 25 and 26 can be the well-known magnetic sensors that detect a magnet mounted on the shaft, shown as a dashed line, of motor 44 and that produce pulses having a frequency based on the rate of rotation of that motor shaft.

The signal from the switching circuit 8 which is changed in position by the switching signal from the timing signal generating circuit 7 is amplified by amplifiers 9A and 9B and then supplied through contacts R of switching circuits 10A and 10B to the rotary heads 11A and 11B and thereby recorded on a tape 14 that is wound around and stretched between reels 12 and 13. The switching circuits 10A and 10B are connected to their respective contacts R upon recording and to their respective contacts P upon reproducing.

Amplifiers 15A and 15B are respectively supplied with the reproduced outputs from the corresponding rotary heads 11A and 11B when the switching circuits 10A and 10B are changed in position to the contacts P upon playback. The outputs from these amplifiers 15A and 15B are both fed to a switching circuit 16. Similarly to the recording mode during playback at standard speed, the switching circuit 16 is alternated between its two positions by the switching signal S10 of 30 Hz from the timing signal generating circuit 7 so that it is alternately in one position during the half-rotation interval including the tape contact period of the rotary head 11A and in the other position during the half-rotation interval including the tape contact period of the rotary head 11B.

The output signal switched by the switching circuit 16 is supplied through an equalizer 17, a comparator 18 and a PLL (phase-locked loop) circuit 19 to an error detecting/correcting circuit 20 in which any error thereof is detected and, if necessary, corrected. The resultant signal therefrom is supplied to a D/A (digital-to-analog) converter 21 in which it is converted from a digital signal to an analog signal. This analog signal is then supplied through an LPF (low-pass filter) 22 to an output terminal 23 as the original signal.

Alternatively, the digital signal can be derived directly from a terminal 24 provided at the output of the error detecting/correcting circuit 20.

An envelope detecting circuit 27 is provided at the output of the switching circuit 16, and, on the basis of the output S6 (FIG. 5B) from the envelope detecting circuit 27, a mask signal generating circuit 28 generates a mask signal S7 (FIGS. 5C and 6D) for masking a period in which no data is obtained, such as when the rotary heads 11A and 11B do not trace the tape 14. This mask signal S7 is generated when the RF output data exceeds a certain threshold level Th (FIG. 5B). The mask signal S7 generated by the mask signal generating circuit 28 is supplied to respective first outputs of AND circuits 29 and 30. The AND circuits 29 and 30 are also supplied at their respective second inputs with a window signal S8 (FIG. 6C) that is generated by the timing signal generating circuit 7 in response to the outputs of the pulse generator 25 and the frequency generator 26. This (pulse code modulation) window signal S8 has a pulse width large enough to contain the PCM region of the reproduced data signal. Further, the output S1 (FIG. 4A) (or S20 (FIG. 9A), as explained below) from the comparator 18 is supplied to the AND circuit 29 at its third input so that the AND circuit 29 produces at its output only the portion of the RF output signal that is within the PCM region and exceeds a certain level. This ensures that the RF output has a level high enough to read out the data.

The reason the output from the AND circuit 29 (FIG. 1A) is supplied to a ½ frequency divider 31 (FIG. 1B) and the derived RF data is divided by 2 to produce the signal S2 (FIG. 4B) is that, in the PCM region, the longest pattern can always be obtained by dividing the consecutive synchronizing signal portions formed of the maximum transition intervals 4T and 4T and that, since the number of synchronizing signals in one track is determined beforehand, it is possible to anticipate the probability that the longest pattern will occur.

The output S2 from the ½ frequency divider 31 is supplied to an edge detecting circuit 32 in which the edge thereof is detected and then supplied as a signal S3 (FIG. 4C) to the clear terminal CL of a counter 33 as a clear signal. The counter 33 clears its content each time this clear signal is fed to the clear terminal CL thereof. A clock generator 34 supplies to the counter 33 a clock signal S4 (FIG. 4D) having a period that is substantially shorter than the period of a particular pattern of a data, for example a period of 4T. The frequency of the clock signal from the clock generator 34 is selected to be 9.408 MHz, by way of example.

The output of the counter 33 is supplied to a peak-hold circuit 35 that is provided as first holding means in which the peak or maximum value of the counted value from the counter 33 is held. In order to generate a timing signal which is used by the peak-hold circuit 35 to hold the maximum value, a trailing edge detecting circuit 56 is provided at the output of the AND circuit 30 in which the output S12 (FIG. 7A) of the AND circuit 30, or the trailing edge of the mask signal within the pulse width of the PCM window signal, is detected. Although the resultant signal S14 (FIG. 7C) or S9 (FIG. 6E) may be directly supplied to the peak-hold circuit 35 as the timing signal, it is desirable that the resultant signal be supplied thereto not directly but in response to the length of the transition interval of the reproduced data. The output from the peak-hold circuit 35 is supplied to a bottom-hold circuit 36 that is provided as a second holding means. The bottom-hold circuit 36 is used to hold the bottom or minimum value of the maximum value of the counted value that is held by the peak-hold circuit 35. In order to generate the timing signal used by the bottom-hold circuit 36 to hold the bottom value, an edge detecting circuit 37 is connected to receive the output switching signal S10 (FIG. 6A) of the timing signal generating circuit 7 and to detect the leading and trailing edges thereof. The resultant signal S11 (FIG. 6F) is supplied to the bottom-hold circuit 36 as the timing signal. The output from the bottom-hold circuit 36 is supplied to a latch circuit 38 in which it is latched. The latch timing of the latch circuit 38 is determined by the edge detecting circuit 37 similarly to the bottom-hold circuit 36.

The latched content of the latch circuit 38 is supplied to a comparator 39 in which it is compared with a reference count value supplied thereto from a terminal 40. The reference count value is a counted value that is held by the bottom-hold circuit 36 so that when in the reproducing mode it can be determined whether the relative speed is equal to that which was used in the recording mode. For example, if the frequency of the clock signal generated from the clock generator 34 is selected to be 9.408 MHz as described above, the reference count value becomes 8 clock pulses. Accordingly, when the output (counted value) from the latch circuit 38 is smaller than the reference count value from the terminal 40, the relative speed is high; while, when it is larger than the reference count value, the relative speed is low.

The compared error signal from the comparator 39 is supplied to a D/A converter circuit 41 in which it is converted from a digital signal to an analog signal. This analog signal is supplied to a drum servo circuit 42 as relative speed information and the output signal from the drum servo circuit 42 is supplied through a contact a of a switching circuit 43 to a motor 44 which rotates the rotary drum (not shown) on which the rotary heads 11A and 11B are mounted. Thus, the motor 44 is servo-controlled by the drum servo circuit 42.

The frequency divider 45 (FIG. 1A) is provided to divide the frequency of the reproduced clock signal S21 (FIG. 9B) generated from the reproduced digital data in the PLL circuit 19 by a predetermined ratio. The output S22 (FIG. 10A) from the frequency divider 45 is supplied through a switch 46 to an F/V (frequency-to-voltage) converting circuit 47 in which it is converted from a frequency signal to a voltage signal S23 (FIG. 10B). The switch 46 is controlled by an error check output signal S19 (FIG. 8B) produced by the error detecting-/correcting circuit 20. When an error occurs, the error check output signal S19 assumes, for example, a high level, and the switch 46 is turned on. The voltage signal S23 from the F/V converting circuit 47 is supplied to one input terminal of a comparator 48, in which it is compared with a reference voltage supplied to the other input terminal thereof from a reference voltage generating circuit 49. The compared error signal from the comparator 48 is supplied to a drum servo circuit 50 as the relative speed information and the motor 44 is selectively controlled by this drum servo circuit 50 via the switching circuit 43. In other words, the apparatus of the invention includes two drum servo systems one of which is the servo system including the drum servo circuit 42 and the components associated therewith and the other of which is the servo system including the drum servo circuit 50 and the components associated therewith. The two drum servo systems are properly switched in response to the relative speed between the heads 11A and 11B on the one hand and the tape 14 on the other, as described below.

A switching means 51 (FIG. 1A) is provided to change over the switching circuit 43 (FIG. 1B) provided at the output of the drum servo circuits 42 and 50. The switching means 51 is operated in such a manner that, when the relative speed between the heads 11A and 11B and the tape 14 deviates significantly from a set value or the reproduced data and the reproduced clock are not synchronized with each other, the switching means 51 produces an output signal of, for example, a low level by which the switching circuit 43 is switched to its contact a; while, when the relative speed is sufficiently close to the set value or the reproduced data and the reproduced clock are synchronized with each other, it produces an output signal of a high level by which the switching circuit 43 is switched to its contact b.

By way of example, the switching means 51 is formed of a circuit which consists of a counter 52, a NAND circuit 53, an inverter 54 and a D-type flip-flop circuit 55. The signal S10 (switching pulse of FIG. 6A) that is supplied to the switching circuit 16 (FIG. 1B) by the timing signal generating circuit 7 (FIG. 1A) is supplied also to a reset terminal R of the counter 52 and to a clock terminal CK of the flip-flop circuit 55. In synchronism with, for example, the trailing edge of this switching pulse, the counter 52 is reset and the flip-flop circuit 55 latches the input data. The outputs from output terminals QA and QB of the counter 52 are respectively supplied to the input terminals of the NAND circuit 53. The output from the NAND circuit 53 is supplied to an enable terminal E of the counter 52 and, through the inverter 54, to an input terminal D of the flip-flop circuit 55. When the signal supplied to the enable terminal E of the counter 52 is, for example, high, the counter 52 carries out the count operation; and when this signal is low, the counter 52 stops counting. The output from an output terminal Q of the flip-flop circuit 55 is supplied to the switching circuit 43 (FIG. 1B) as the switching signal to control the state thereof.

The output S14 (FIG. 7C) or S9 (FIG. 6E) from the trailing edge detecting circuit 56 (FIG. 1B) may be directly supplied to the peak-hold circuit 35. In this case, however, certain problems occur. The peak-hold time interval tp of the data length is selected to be the time interval of a bead-shaped portion of the RF output waveform. If the half period of the switching pulse is taken as tD, the condition $0 < tp < tD$ is satisfied. Therefore, peak-hold time interval tp can assume any value within a wide range. Accordingly, when the peak-hold time interval tp is short, for example less than the period of one block of data, the peak-hold time may not contain any sync portion. On the other hand, when the peak-hold time interval tp is long, for example in the normal playback mode, where all of the half-periods of the switching pulse become equal to one peak-hold interval, the number of the peak-holding operations within the bottom-hold interval is reduced and the reproduced signal becomes weak and subject to drop-out. For these two reasons, it becomes impossible to obtain accurate relative speed error information.

Therefore, an AND circuit 57 (FIG. 1B) is provided at the output side of the trailing edge detecting circuit 56, and the output S14 or S9 from the trailing edge detecting circuit 56 is supplied to one input terminal of the AND circuit 57. An output signal S15 (FIG. 7D) of low level is supplied to the other input terminal of the AND circuit 57. The signal S15 is developed by a monostable multi-vibrator or one-shot circuit 59 (FIG. 1B) which receives as an input the output S13 (FIG. 7B)

from a leading edge detecting circuit 58. The latter circuit detects the leading edge of the output signal S12 from the AND circuit 30. The signal S13 supplied to the one-shot circuit 59 results in a pulse length of a predetermined time, for example 76.5 $\mu$s (corresponding to two blocks of data), so that it contains two sync portions from the detection of the leading edge. In other words, when the time length of the reproduced data obtained at the output of the AND circuit 30 is short, the leading edge detecting circuit 58 is inhibited from generating an output signal S13 (holding pulse) during a predetermined time from the leading edge of the reproduced data.

A reset pulse generating circuit 60 (FIG. 1A) is connected to the output of the leading edge detecting circuit 58 (FIG. 1B). This reset pulse generating circuit 60 receives the signal S13 (FIG. 7B) and is adapted to supply a reset pulse S16 (FIG. 7E) to the AND circuit 30 (FIG. 1A) a predetermined time after the output signal S13 of the leading edge detecting circuit 58. This predetermined time may be, for example, 230 $\mu$s (corresponding to six blocks of data). In other words, when the length of the data obtained at the output of the AND circuit 30 is long, the output S13 from the leading edge detecting circuit 58 is supplied to the peak-hold circuit 35 at predetermined intervals from the leading edge of the reproduced data.

FIGS. 2–9 show the operation of the circuit shown in FIG. 1.

Figure 2:
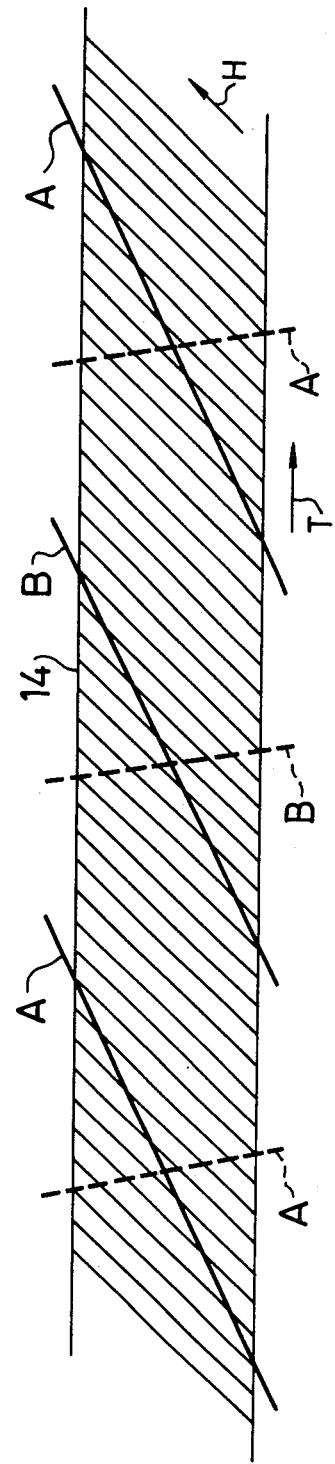
FIG. 2 is a diagram showing tracing loci of a rotary head with respect to a magnetic tape on which signals are recorded and from which they are reproduced during the operation of the apparatus shown in FIG. 1.
Figure 3:
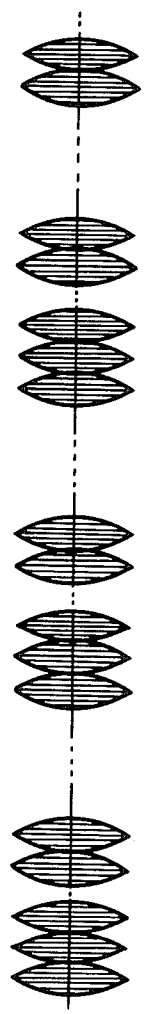

When the reproducing apparatus is in the fast-forward mode or the rewind mode, the loci of the rotary heads 11A and 11B become as shown by A and B in FIG. 2. In the figure, the broken lines show the loci of the heads 11A and 11B in the fast-forward mode, the solid lines show those in the rewind mode, $\underline{H}$ the rotation direction of the rotary heads 11A and 11B, and $\underline{T}$ the direction of movement of the tape 14, respectively. Since the heads 11A and 11B produce outputs from tracks whose azimuths are coincident with those of the heads but produce essentially no outputs from tracks whose azimuths are not coincident with those of the heads, the heads generate reproduced signals whose waveforms have a so-called bead-shape as shown in FIG. 3. When the reproduced signal is passed through the equalizer 17 (FIG. 1B) and the comparator 18, the comparator 18 generates a reproduced digital signal S1 or S20 of a square waveform as shown in FIG. 4A or 9A. The signal S1 will be considered first. The period of the square waveform signal S1 changes in accordance with the magnitude of the relative speed between the heads 11A, 11B and the tape 14. Accordingly, if, as described later, the relative speed corresponding to the signal S1 from the comparator 18 is detected and servo control is applied to the drum motor 44 through the drum servo circuit 42 and so on in accordance with the magnitude of the relative speed, the relative speeds of the heads 11A and 11B with respect to the tape 14 can be controlled to be made constant.

The relative speed of the heads 11A and 11B with respect to the tape 14 is detected through the servo system including the drum servo circuit 42. As FIG. 4A shows, the reproduced digital output signal S1 from the comparator 18 is formed of four periods or intervals T, 2T, 3T and 4T, where T is taken as a fundamental period. The output signal S1 from the comparator 18 is supplied to the AND circuit 29.

The switching circuit 16 generates a signal S5 or S18 shown in FIG. 5A or 8A. The signal S5 will be considered first. When the signal S5 is supplied to the envelope detecting circuit 27, the envelope detecting circuit 27 generates the signal S6 whose waveform is shown in FIG. 5B. The output signal S6 is supplied to the mask signal generating circuit 28 (FIG. 1A) in which the envelope detected output signal S6 is reshaped with a threshold level Th as a reference. As a result, the mask signal generating circuit 28 generates a signal S7 shown in FIGS. 5C and 6D. The signal S7 is supplied to the AND circuit 29. The AND circuit 29 is also supplied with the PCM window signal S8, the waveform of which is shown in FIG. 6C, that is generated by the timing signal generating circuit 7 in response to the outputs from the pulse generator 25 and the frequency generator 26. FIGS. 6B to 6D show the relationship of the PCM window S8 with respect to the signals S5 and S7.

The signal S1 passed through the AND circuit 29 on the basis of the signals S7 and S8 as the gating signals is divided by 2 in the $\frac{1}{2}$ frequency divider 31 and becomes the signal S2 shown in FIG. 4B. The output signal S2 from the frequency divider 31 is supplied to the edge detecting circuit 32 in which the leading and trailing edges thereof are detected. As a result, the edge detecting circuit 32 generates at its output the signal S3 of which the waveform is shown in FIG. 4C. The signal S3 is supplied to the clear terminal CL of the counter 33 as its clear signal so that during the period between successive signals S3, the counter 33 counts the clock signal S4, the waveform of which is shown in FIG. 4D and which is supplied from the clock generator 34. The counted value from the counter 33 is fed to the peak-hold circuit 35.

The signals S7 and S8 are supplied through the AND circuit 30 to the trailing edge detecting circuit 56 so that the trailing edge detecting circuit 56 produces at its output the signal S9 shown in FIG. 6E. The output signal S9 therefrom is supplied as the signal S17 to the peak-hold circuit 35, whereby the peak or maximum value of the counted value from the counter 33 is held. In accordance with the present invention, the signal S9 is supplied to the peak-hold circuit 35 by a control means formed of the AND circuit 57, the leading edge detecting circuit 58, the delay circuit 59 and the reset pulse generating circuit 60 in response to the data length of the reproduced data.

When the AND circuit 30 generates at its output the signal S12, whose waveform is shown in FIG. 7A, the leading edge detecting circuit 58 detects the leading edge of the signal S12 and generates at its output the signal S13 whose waveform is shown in FIG. 7B. The trailing edge detecting circuit 56 detects the trailing edge of the signal S12 and generates at its output the signal S14, the waveform of which is shown in FIG. 7C. The signal S14 is supplied to one input terminal of the AND circuit 57. The signal S15, which is shown in FIG. 7D and results from producing a signal having a fixed pulse width based on the signal S13 in the one-shot circuit 59, in which the pulse width is 76.5 $\mu$s, is supplied to the other input terminal of the AND circuit 57. Accordingly, during the period in which the signal S15 is high, the AND circuit 57 opens its gate to allow the signal S14 to pass therethrough; while, when the signal S15 is low, the gate of the AND circuit 57 is closed and the signal S14 is not allowed to pass therethrough. As a result, the AND circuit 57 produces at its output the signal S17 shown in FIG. 7G. The output signal S17 is supplied to the peak-hold circuit 35 whereby the maximum or peak value from the counter 33 is held. In other words, when the pulse width of the signal S17 corresponding to the reproduced data is narrow (corresponding to the first pulse in FIG. 7A), even if the trailing edge thereof is detected by the trailing edge detecting circuit 56 thereby to generate the signal S14 (corresponding to the first pulse in FIG. 7C), the signal S15 is low during such period so that the AND circuit 57 does not generate the corresponding signal S17 and is inhibited from generating the holding pulse.

After 230 μs measured from the time when the leading edge detecting circuit 58 generates the signal S13, the reset pulse generating circuit 60 (FIG. 1A) generates the signal S16 shown in FIG. 7E as a reset pulse. The signal S16 is supplied to the AND circuit 30. Then, the signal S12 generated at the output of the AND circuit 30 is changed to a signal S12' shown in FIG. 7F. As a result, in synchronism with the trailing edge of a signal S12' (FIG. 7F), the trailing edge detecting circuit 56 (FIG. 1B) generates a signal S14 that is shown by a broken line in FIG. 7C; while, in synchronism with the leading edge of the signal S12', the leading edge detecting circuit 58 generates the signal S13 that is shown by a broken line in FIG. 7B. Because of the generation of the signal S13, the signal S15 from the one shot circuit 59 is changed as shown in FIG. 7D by the broken line. Since the signal S15 is high when the signal S14 is generated by the trailing edge detecting circuit 56, the AND circuit 57 opens its gate and generates at its output the signal S17 that is shown by a broken line in FIG. 7G. This output signal S17 is supplied to the peak-hold circuit 35 as a holding pulse. In other words, when the pulse width of the signal S17 corresponding to the reproduced data is large (corresponding to the fourth pulse in FIG. 7A), the reset pulse generating circuit 60 generates the reset pulse at every 230 μs; correspondingly, the AND circuit 57 is caused to generate the holding pulse.

The maximum or peak value held by the peak-hold circuit 35 (FIG. 1B) is supplied to the bottom-hold circuit 36. On the other hand, the signal S10 shown in FIG. 6A derived from the timing signal generating circuit 7 (FIG. 1A) as a switching pulse is supplied to the edge detecting circuit 37 (FIG. 1B) and the trailing and leading edges thereof are detected thereby. Thus, the edge detecting circuit 37 generates at its output the signal S11 whose waveform is shown in FIG. 6F. The signal S11 is supplied to the bottom-hold circuit 36 and to the latch circuit 38 with the result that the minimum value of the peak or maximum value held by the peak-hold circuit 35 is held by the bottom-hold circuit 36. At the same time, such minimum value is latched in the latch circuit 38.

The minimum value latched in the latch circuit 38 is supplied to the comparator 39 in which it is compared with the reference count value, i.e., 8 clock pulses applied from the terminal 40. If the minimum value is equal to 8 clock pulses, the current relative speed between the heads 11A, 11B and the tape 14 is maintained; if the minimum value is smaller than 8 clock pulses, since the relative speed is high, it is controlled to become slower; and if the minimum value is larger than 8 clock pulses, since the relative speed is slow, it is controlled to become faster. To this end, the compared error signal from the comparator 39 is converted from a digital signal to an analog signal by the D/A converter circuit 41 and then supplied to the drum servo circuit 42 as relative speed information. By this drum servo circuit 42, the motor 44 is controlled in accordance with the content of the compared error signal.

Alternatively, the holding operation may be carried out by the peak-hold circuit 35 and the bottom-hold circuit 36 as follows. The value [00] assumes a case where there exists neither a value more than the reference count value nor a value more than the reference count value +1; [10] assumes a case where there exists a value more than the reference count value but there exists no value more than the reference count value +1; and [11] assumes a case where there exist both values more than the reference count value and the reference count value +1. Then, the peak-hold circuit 35 may carry out the holding operation under the priority order of [11], [10] and [00], while the bottom-hold circuit 36 may carry out the holding operation under the priority order of [00], [10] and [11].

The servo system including the drum servo circuit 42 and so on which employ the 4T pattern has been described first, and the other servo system including the drum servo circuit 50 and so on which employs the reproduced clock will now be described.

When the reproducing apparatus of the invention is in the fast-forward mode or in the rewind mode, the switching circuit 16 (FIG. 1B) generates at its output a signal S18 of a bead-shape RF wavefrom shown in FIG. 8A. The signal S18 is supplied through the equalizer 17 to the comparator 18 (FIG. 1A) which therefore generates at its output a signal S20 (reproduced data) of square waveform shown in FIG. 9A. The output signal S20 from the comparator 18 is supplied to the PLL circuit 19 which generates, if the reproduced data is correct, the reproduced clock signal S21 that is synchronized with the reproduced data. The waveform of the reproduced clock signal S21 is shown in FIG. 9B. Whether or not the reproduced data is correct can be determined by the error check output S19 shown in FIG. 8B that is generated by the error detecting circuit 20. In other words, when the signal S19 is high, the reproduced data is correct. When the signal S19 is high, the switch 46 is closed and a reproduced clock signal S22 shown enlarged in FIG. 10A is supplied to the frequency-to-voltage converting circuit 47.

The frequency-to-voltage converting circuit 47 generates internally a sawtooth wave signal (shown by a solid line in FIG. 10B), which rises with a constant inclination in synchronism with the leading edge of the signal S22. The slant portion of this signal is sampled at the trailing edge of the signal S22 with the result that the frequency-to-voltage converting circuit 47 produces at its output a signal S23 that is converted from a frequency signal to a voltage signal as shown in FIG. 10B by a broken line. The level of the signal S23 increases in proportion to the period of the signal S22. In other words, when the relative speed becomes high, the period becomes short so that the level of the signal S23 becomes low; while, when the relative speed is low, the period becomes long so that the level of the signal S23 becomes high.

The voltage signal S23 from the frequency-to-voltage converting circuit 47 is supplied to the comparator 48 in which it is compared with the reference voltage derived from the reference voltage generating circuit 49. When the level of the signal S23 is higher than that of the reference signal, the comparator 48 produces at its output a positive compared error signal, while when the former is lower than the latter, the comparator 48 produces at its output a negative compared error signal.

The compared error signal from the comparator 48 is supplied to the drum servo circuit 50 as the relative information.

The counter 52 is reset by the signal S10 in synchronism with the trailing edge of the switching pulse and sequentially counts the error check output S19 derived from the error detecting/correcting circuit 20. During one period of the switching pulse or during both the tracing periods of the heads 11A and 11B, when the counter 52 counts a predetermined number, for example three, of signals S19, the data is correctly reproduced so that the counter 52 produces an output [11] at its output terminals QA and QB. Thus the NAND circuit 53 produces at its output a signal of a low level because of which the counter 52 stops its counting operation. Further, the signal from the NAND circuit 53 is supplied through the inverter 54 to the input terminal D of the flip-flop circuit 55 in which it is latched at the trailing edge of the next switching pulse. As a result, the flip-flop circuit 55 produces at its output terminal Q a signal of a high level by which the switching circuit 43 is changed in position to its contact b.

Accordingly, the output from the drum servo circuit 50 is supplied to the motor 44 so that when the compared error signal is positive, the drum servo circuit 50 accelerates the motor 44, while when it is negative, the drum servo circuit 50 decelerates the motor 44. In other words, the motor 44 is accelerated when the relative speed is lower than the set value; while the motor 44 is decelerated when it is higher than the set value. Thus, the relative speed between the rotary heads 11A, 11B and the tape 14 is controlled to be constant.

As described above, when the reproduced data is not synchronized with the reproduced data and the relative speed deviates significantly from the set value, the servo control is carried out by using the servo system including the drum servo circuit 42 and other components associated therewith; while, when the reproduced data is synchronized with the reproduced data and the relative speed is closer to the set value, the servo control is carried out by using the servo system including the drum servo circuit 50 and other components associated therewith. Thus, it becomes possible to carry out the control of the relative speed with very high accuracy and fine precision.

While in the afore-mentioned embodiments the reproduced data is regarded as correct only when three error check output signals are obtained over the tracing periods of both of the heads 11A and 11B, other arrangements are possible for determining whether or not the reproduced data is correct. For example, the reproduced data may be regarded as correct when the error check output signals of a desired number are produced during a period in which either of the heads 11A and 11B traces the tape 14.

Many modifications of the preferred embodiments of the invention described above will readily occur to those skilled in the art upon consideration of this disclosure. For example, the delay time and frequencies employed, the specific circuitry employed to implement the various functions described above, and the several waveforms illustrated in the drawings can be modified or varied in accordance with the operating characteristics of different systems. Accordingly, the invention is limited only by the appended claims.

We claim as our invention:

1. Apparatus for reproducing a digital signal comprising:
   transport means for moving a tape;
   rotary head means for reproducing a digital signal recorded on the tape, said digital signal having information encoded therein by successive multiple transitions having respective transition intervals;
   a motor for driving said rotary head means;
   detecting means for detecting said transitions from the moving tape;
   counting means for accumulating a count proportional to the transition intervals of said detected transitions; and
   control means for controlling the rotation of said rotary head means in response to said count and including first holding means for holding a maximum value of said count during a first predetermined period, second holding means connected to said first holding means for holding a minimum vlaue of said maximum value during a second predetermined period longer than said first predetermined period and producing an output corresponding thereto, and comparing means for comparing said output with a reference value and generating a compared output that is employed to control the speed of said motor, so that the relative speed between said rotary head means and said moving tape is made constant.

2. Apparatus for reproducing a digital signal according to claim 1, in which said maximum value in said first holding means corresponds to a synchronizing signal of a reproduced digital signal.

3. Apparatus for reproducing a digital signal according to claim 1, in which said control means further comprises holding pulse generating means for generating a holding pulse in response to the length of a transition interval of said reproduced digital signal, said holding pulse being supplied to said first holding means for controlling the operation thereof.

4. Apparatus for reproducing a digital signal according to claim 3, in which said holding pulse generating means includes inhibiting means for inhibiting generation of said holding pulse during a predetermined period from a given transition of said reproduced digital signal when the length of the transition interval of said reproduced digital signal is short of a predetermined value.

5. Apparatus for reproducing a digital signal according to claim 3, in which said holding pulse generating means includes means for causing generation of said holding pulse at a predetermined period from a given transition of said reproduced digital signal when the length of the transition interval of said reproduced digital signal exceeds a predetermined value.

6. Apparatus for reproducing a digital signal according to claim 1, in which said detecting means includes frequency dividing means for dividing said reproduced digital signal.

* * * * *